UNITED STATES PATENT OFFICE.

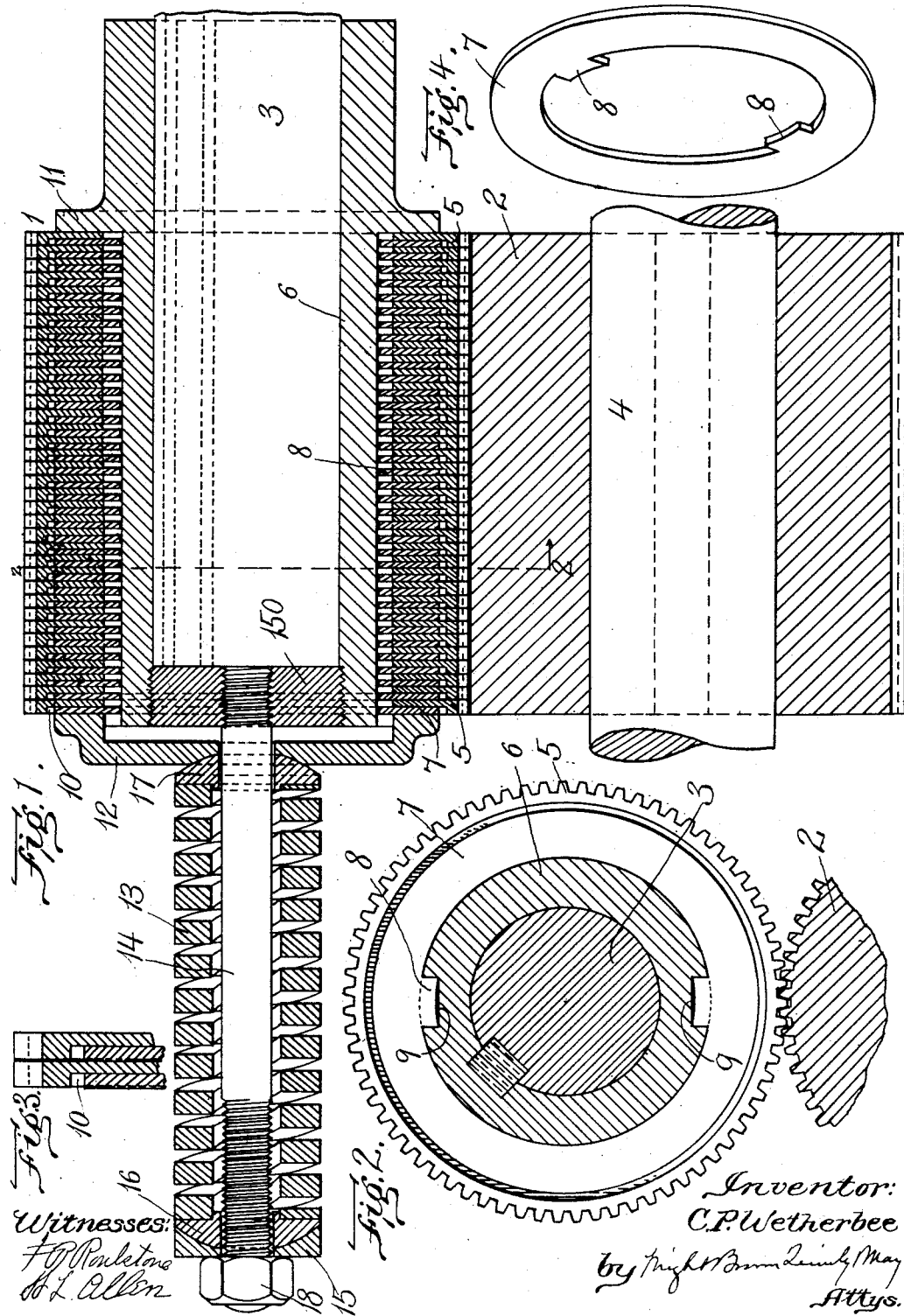

CHARLES P. WETHERBEE, OF BATH, MAINE, ASSIGNOR TO GEORGE WESTINGHOUSE, OF PITTSBURGH, PENNSYLVANIA.

MULTIPLE-DISK GEARING.

1,038,047.

Specification of Letters Patent.

Patented Sept. 10, 1912.

Application filed December 27, 1909. Serial No. 535,194.

*To all whom it may concern:*

Be it known that I, CHARLES P. WETHERBEE, of Bath, in the county of Sagadahoc and State of Maine, have invented certain new and useful Improvements in Multiple-Disk Gearing, of which the following is a specification.

This invention relates to gearing particularly designed to transmit heavy powers at high speed. Gears designed for this purpose require a great width of bearing face on their teeth, particularly when used for transmitting power from turbine engines. For instance in transmitting the power from the turbine of a steamship to the propeller shaft, it is sometimes necessary to employ gears having a face width of as much as one hundred inches. That is the extent of the gears in the direction of their axes is this amount. In other words, it is necessary to use gears of which the width, or dimension parallel to the axis is relatively great as compared with the diameter. With gears of this character it is difficult if not impossible to cut the teeth and aline the shafting so accurately that intermeshing teeth will bear evenly upon each other throughout the whole width of their contacting faces. This is particularly true where either of the shafts is run at very high speed, as in the case of the turbine shaft. The result of the uneven bearing which cannot be avoided with solid gears is that the pressure which should be distributed evenly throughout the entire length of the teeth in contact is concentrated at one point on the teeth and crushes the metal thereof, causing rapid wear, noise and vibration.

It is my object to overcome the difficulty encountered in connection with gearing of this character by making the teeth of one gear of a pair locally yielding, so that in case the bearing pressure is concentrated at one point on a tooth this part of the tooth may yield sufficiently to enable all parts of the tooth to take their share of the pressure. I have found that this object may be carried into effect by making such gear composite, that is, by forming the complete gear out of a number of gear-shaped disks placed side by side on a holder with provisions for moving independently about the holder oppositely to the direction of rotation, where the composite gear is used as the driver, or in the direction of rotation when it acts as the driven gear, and in any case, transversely of the axis of rotation in the line of thrust applied by or to it, and applying means such as friction for resisting such independent motion. There are other ways in which my object may be carried into effect, but the method indicated above and hereinafter more specifically described is the one which I believe to be the most practical and economical.

The principles of the invention are applicable to all forms of gearing, such as spur, bevel, and spiral gears or pinions, worm wheels and all other types of toothed power-transmitting elements as well, including clutches, whatever the form of the element may be, whether cylindrical or otherwise, and whether the teeth are formed on the periphery or face of the element. As the principles of the invention are the same whatever may be the type of gear or toothed machine element, it is unnecessary to illustrate and describe more than one form of toothed element in which the invention may be embodied, and accordingly I have illustrated and described only the spur gear or pinion form, stating, however, that I do not by any means limit the scope of my invention and of the claims in which the invention is set forth to this particular form or type of gearing.

In the drawings, Figure 1 represents a longitudinal section of a pair of gears in which my invention is embodied, and by which the form of one application thereof is illustrated. Fig. 2 is a cross-section of the gearing on the line 2—2 of Fig. 1. Fig. 3 is a detail of the composite or multiple disk gear. Fig. 4 is a perspective view of a friction disk forming one member of the composite gear.

The same reference characters indicate the same parts in all the figures.

1 and 2 represent complemental gears suitably secured to shafts 3 and 4 respectively. Either of these shafts may be the driver and either the follower. These gears are of comparatively great length, and consequently the bearing over the intermeshing teeth is very wide in comparison to the width or height of such teeth. If the teeth on the two gears are not exactly parallel they will not bear evenly over their entire extent when coming into mesh, and the pressure transmitted from one to the other will, therefore, in the case of solid gears be concentrated on a small area, with resulting injury to the metal and rapid wear, accompanied also by objectionable noise. In the manufacture of gears having substantially the proportions illustrated, it is almost impossible to make the sides of their teeth absolutely straight and to aline them so that the bearing on meshing teeth is uniformly distributed. This difficulty is still further increased when the shafts on which the gears are mounted are long and are run at high speeds. One of the gears, as the gear 1, is made of a large number of sections, each section being a disk 5. These disks are provided with gear teeth on their peripheries when made as parts of a spur gear and are placed side by side upon the shaft 3 or upon a holder 6, mounted upon said shaft. The disks loosely surround the holder, whereby they are enabled to rotate independently about the axis of the latter and of the shaft, and may be brought into such position that their teeth are in alinement. The pitch of the teeth on all the disks is of course uniform in a composite spur gear and proportionately varying for gears of other characters, so that when the disks are thus alined, their teeth together form the perfect teeth of a complete gear or other toothed element.

As a means for resisting the rotary movement of the disks about the holder and thereby enabling the power to be transmitted to or from the gear 1, I interpose friction disks 7 between the toothed disks 5. These friction disks have key members 8 shown in Fig. 2, which enter longitudinal grooves or keyways 9 in the holder 6. The friction disks are thus capable of moving longitudinally on the holder, but are incapable of rotating independently thereof. There may be as many of the friction disks as of the toothed disks, arranged in regular alternation therewith, or the friction disks may be fewer in number and spaced relatively to the toothed disks in any arrangement desired. The toothed disks may be recessed at 10 as shown in Figs. 1 and 3 to admit the friction disks into their side faces and thereby enable the teeth to be practically continuous throughout the whole length of the composite gear. As shown in Fig. 3, the recess, however, is not quite as deep as the thickness of the friction disk and thus the disks are enabled to be brought into as tight frictional contact as desired, without causing the toothed disks to come into direct contact with each other. Thus contact of the intermediate disks with the toothed disks is assured and danger of the pressure being borne wholly or in part by the toothed disks with resulting failure of proper pressure being brought against the friction disks between them is eliminated.

At one end of the composite gear is an abutment 11, formed by a shoulder on the holder 6, and at the other end is a spring-actuated abutment 12. The latter is held compressed against the disks by a spring, one form of which, where the gear is at the end of its shaft, is a spring 13 surrounding a rod 14, which extends from the end of the shaft or holder. The rod is threaded at its end either into the shaft or into a nut 150 which is screwed internally into the holder 6 adjacent to the end of the shaft 3. On the outer end of the rod 14 is a composite washer 15 against which the spring 13 bears. The part of the washer engaged by the spring is a spherical segment 16 adapted to adjust itself so as to take the thrust of the spring squarely. The other end of the spring 14 bears against a washer 17, which has a spherical surface engaging a recess in the abutment 12. A nut 18 on the outer end of the rod 14 enables the force of the spring to be adjusted. The spring 13 acting through the abutment or head 12 forces the disks toward the shoulder 11 and thereby causes the toothed disks 5 to be frictionally clamped. The amount of this friction is regulated so that it is not too great to permit any single disk to yield when excessive pressure is concentrated upon it, but it is great enough to cause the combined disks to transmit the power required.

As above noted, the arrangement described and illustrated is used when the gear is applied upon the end of a shaft. In case the gear should be put in the middle of a long line of shafting, or at some distance from the end of a shaft, a slight modification in the proportions of the parts last described will be made, without in any way departing from or otherwise affecting the spirit of the invention. In the case last supposed, the spring 13, washers and nut, are made sufficiently large to encircle the shaft and the nut is screwed upon a thread cut directly on the shaft.

If desired the head 12 may be made sufficiently resilient to enable the external spring 13 to be dispensed with. In this case a nut bearing directly against the part 12 will enable sufficient yielding frictional pressure to be brought against the disks for the purpose desired.

Many modifications of the structural features of the device may be made, without departing from the spirit of the invention. Thus it is not necessary to mount the toothed and friction disks on an additional holder, but they may if desired be mounted directly upon a shaft. The holder, however, is convenient in enabling the composite gear as a whole to be readily removed from and applied to a shaft.

I claim,

1. A pair of coöperating gears, one of which is composed of separate members adapted to yield independently against frictional resistance for causing the power transmitted to be evenly distributed over the contacting surfaces of engaging teeth throughout the entire length of the gears.

2. A pair of coöperating gears of which the teeth of one are made of a number of frictionally restrained independently yielding elements, the resistance to yielding of any one of said elements being less, and the resistance of all combined being greater, than the force transmitted by the gear, whereby uniform pressure over contacting surfaces of the gear teeth is obtained.

3. A gear wheel having the active portions of its teeth composed of a number of frictionally restrained elements arranged side by side and movable independently in the direction of power transmission, whereby an even and uniform bearing on a complemental gear may be obtained.

4. A gear wheel having the active portions of its teeth composed of a number of frictionally restrained elements arranged side by side and movable independently in the direction of power transmission, and means resisting such motion with a force which is less for each individual element, than the power delivered to or from the entire gear, whereby the teeth are enabled to yield locally to obtain an even bearing on the teeth of a gear in mesh therewith.

5. The combination with a gear, of a gear meshed therewith and consisting of a number of toothed disks loosely mounted upon a rotary holder, friction disks keyed to the holder between adjacent toothed disks, and means for crowding said disks together longitudinally on the holder for frictionally resisting independent movement of the toothed disks.

6. The combination with a gear, of a gear meshed therewith and consisting of a plurality of toothed disks arranged side by side and frictionally held against rotation in the same direction independently of one another.

7. The combination with a gear, of a gear meshed therewith and consisting of a number of toothed disks loosely mounted upon a rotary holder, friction disks keyed to the holder between adjacent toothed disks, and means for crowding said disks together longitudinally on the holder for frictionally resisting independent movement of the toothed disks.

8. The combination with a gear, of a gear meshed therewith and comprising a plurality of disks having alined teeth, and means for holding said disks so as to permit a yieldingly resisted movement of any one relatively to the others about the axis of the gear.

9. The combination with a gear, of a gear meshed therewith and consisting of a plurality of toothed disks arranged side by side and frictionally held against rotation in both directions independently of one another.

10. The combination with a gear, of a gear meshed therewith and consisting of a number of toothed disks rotatably and slidably mounted upon a rotatable holder, friction disks keyed slidable but non-rotatable on the holder between adjacent toothed disks, and means for crowding said friction and tooth disks together longitudinally on the holder for frictionally resisting independent movement of the toothed disks.

In testimony whereof I have affixed my signature, in presence of two witnesses.

CHARLES P. WETHERBEE.

Witnesses:
WM. M. ADAMS,
R. H. DUNTON.